July 28, 1925.  
W. S. GRAHAM  
PLOW  
Filed April 17, 1922  
1,547,806  
2 Sheets-Sheet 2
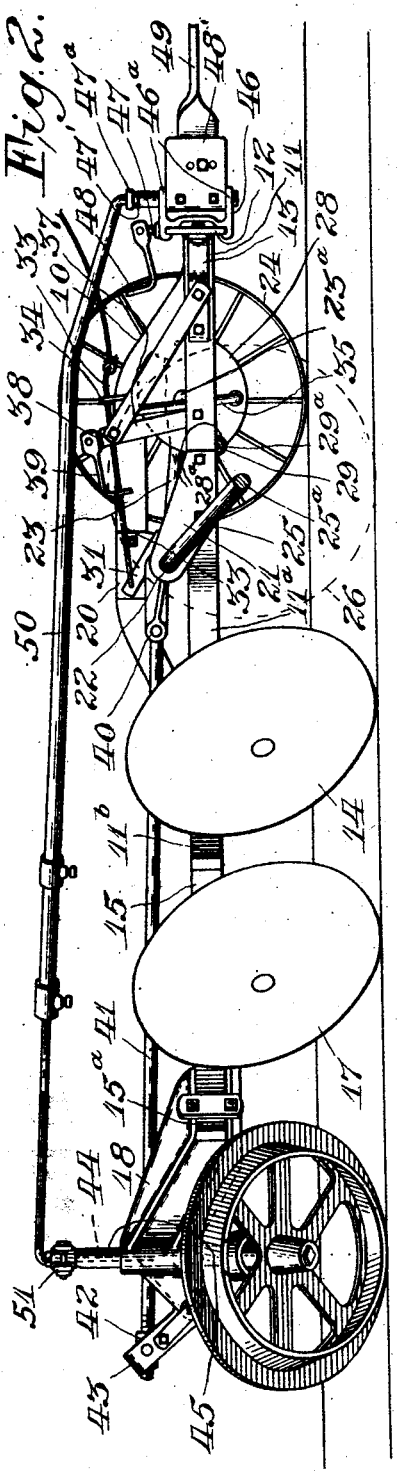
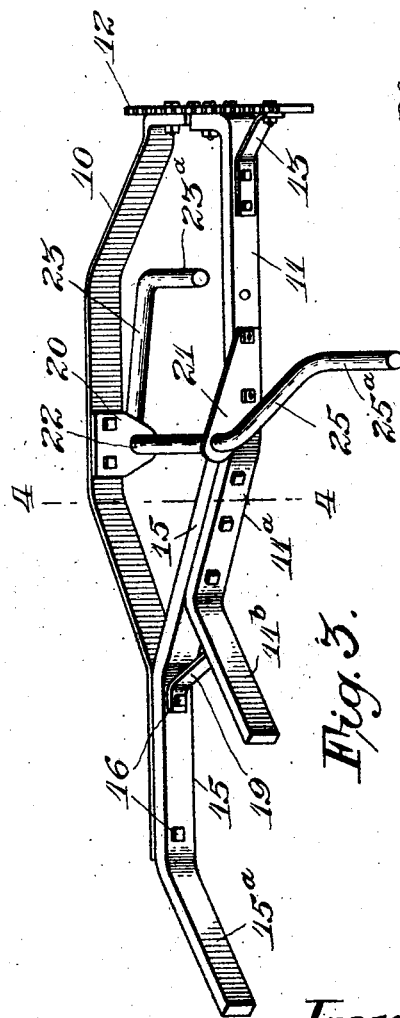
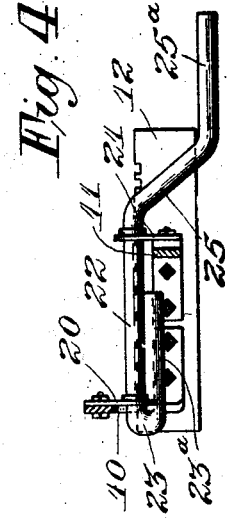
Inventor.
William S. Graham,
By
Atty.

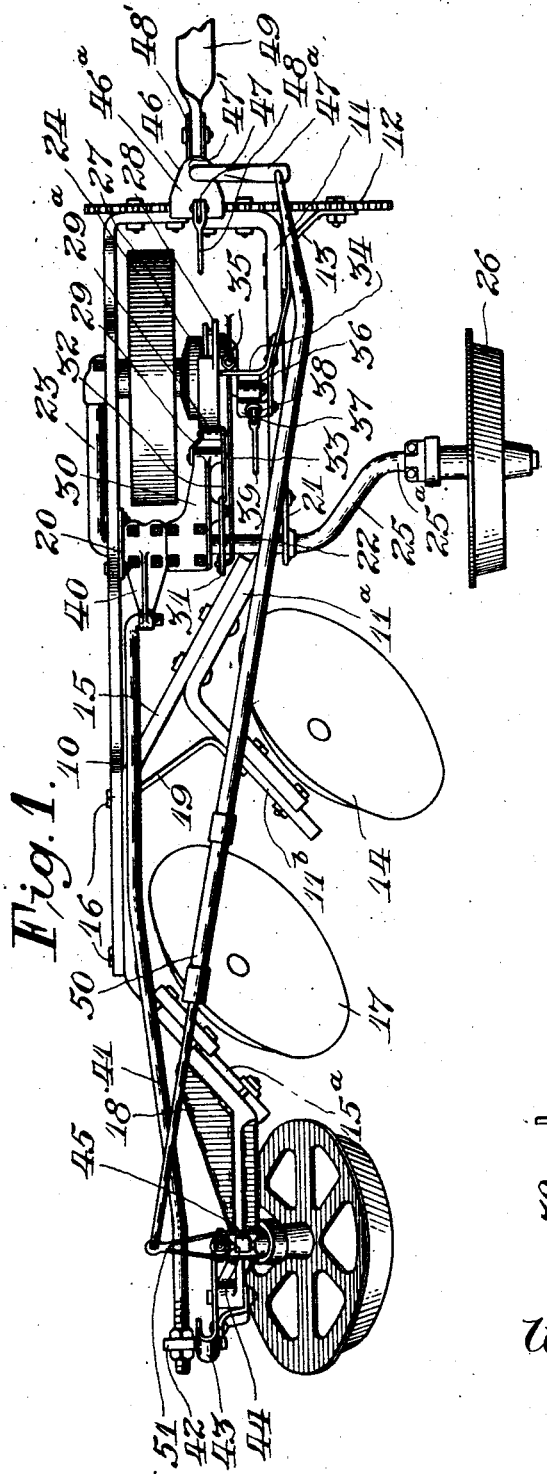

Patented July 28, 1925.

1,547,806

UNITED STATES PATENT OFFICE.

WILLIAM S. GRAHAM, OF CANTON, ILLINOIS, ASSIGNOR TO INTERNATIONAL HARVESTER COMPANY, OF CHICAGO, ILLINOIS, A CORPORATION OF NEW JERSEY.

PLOW.

Application filed April 17, 1922. Serial No. 553,522.

*To all whom it may concern:*

Be it known that I, WILLIAM S. GRAHAM, a citizen of the United States, residing at Canton, in the county of Fulton and State of Illinois, have invented certain new and useful Improvements in Plows, of which the following is a full, clear, and exact specification.

This invention relates to light tractor plows of the type for use in orchards and the primary object is to construct and arrange the elements of the plow in such manner as to adapt it for work under overhanging limbs of trees and close to the tree rows. With this end in view, the frame and front axle of the plow are of special and novel form and the lift mechanism for the plow is so related thereto as to provide a narrow tread and ample range of movement for the axle cranks. Simple adjusting means for the lifting mechanism is also provided and the entire organization made such as to provide an orchard plow that will not upset and that is easily controlled and adjusted and capable of being operated close to trees. The novel features of the construction are more fully set forth in the following specification and defined in the claims.

Referring to the drawings—

Fig. 1 is a plan view of a plow embodying the invention;

Fig. 2 is a side view thereof;

Fig. 3 is a detail perspective view of the plow frame and axle;

Fig. 4 is a detail sectional view on the line 4—4 of Fig. 3;

Fig. 5 is a detail side view of the trip mechanism for the lifting clutch;

Fig. 6 is a detail front view of the adjusting means for the lifting arm; and

Fig. 7 is a detail perspective view of the adjusting block for the lifting arm.

In the present embodiment of my invention the plow comprises a frame composed of forward spaced members 10 and 11 which have their front ends bent toward each other and rigidly connected by a flat hitch plate or bar 12 which extends beyond the frame to the right or furrow side of the plow and is braced to the frame by a member 13. The frame member 11 is first bent inwardly as at 11ª and then outwardly to form the beam or support 11ᵇ for the standard of the front disk 14 and, to the part 11ª of the frame beam 11, a third frame member 15 is rigidly secured in a manner to form a continuation thereof extending to the rear end of number 10 with which it lies in contact and to which it is secured by bolts or other fastenings at 16. Beyond the rear end of member 10, the member 15 is bent outwardly parallel to the forward disk support 11ᵇ and forms a support 15ª for the standard of the second disk 17 and also for the bracket 18 for the rear furrow wheel. A brace 19 may be used between the disk support 11ᵇ and member 15 as shown in Figs. 1 and 3. The frame member 10 is raised or arched from its forward end to the point where it is joined to the rear frame member 15, as shown in Figs. 2, 3 and 4, and the central portion of this arch has a depending bearing bracket 20 fixed thereto. A second bearing bracket 21 is fixed to and extends above the opposite frame member 11 in alignment with the bracket 20 and in these brackets there is journaled the straight transverse or body portion of the one piece axle 22. This axle is formed with opposite offset cranked ends for carrying the land and furrow wheels respectively. The land wheel crank 23 extends forwardly and downwardly at substantially a right angle to the body of the axle and has its end bent inwardly within the frame to form a spindle 23ª for the land wheel 24 as well as a support or connection for the lifting mechanism to be described. The furrow wheel crank 25 is offset below the land wheel crank and extends forwardly and downwardly at an obtuse angle to the body of the axle and has an outwardly extending spindle 25ª for the furrow wheel 26. The effective length of the furrow wheel crank is about half that of the land wheel crank and the cranks are offset to a degree causing the plow to stand substantially level when plowing at an ordinary depth as illustrated in Fig. 2. It is preferable, though not essential, to include power lift mechanism in connection with the construction embodying my invention and for this purpose there is fixed on the inner end of the hub of the land wheel 24 one member 27 of an intermittent clutch. This clutch is preferably of the double acting internal ratchet type, the flange of member 27 being formed with internal notches, and the cooperating intermittently actuated clutch member 28 which is journaled on the end of spindle 23ª having oppositely acting spring pressed pawls mounted on its inner face within the clutch part or housing 27 in position to normally engage the internal notches on its flange. The clutch member 28 is formed with opposite control notches 28ª in which parts of the pawl mechanism are exposed and a spring pressed trip 29 has a roller 29ª positioned to drop into the notches and engage the pawl mechanism to throw out or disengage the members of the clutch. The trip 29 is pivoted to the end of a forwardly projecting arm 30 clamped on axle 22 and, a lever 31, also pivoted on arm 30, has one end connected to the trip by link 32 and an actuating rod 33 is connected to its other end and passes through a guide 34 on the plow frame. As the specific clutch mechanism employed is not part of the present invention, the foregoing description will suffice, as its manner of operation is in general well known to those skilled in the art and it will be evident that each pull on operating rod 33 will withdraw roller 29ª from the notch in which it is fitted causing the clutch to lock and member 28 to turn, the roller 29ª riding on the periphery of said member until it drops into the opposite notch and disconnects the clutch after approximately a half revolution. The clutch member 28 has eccentrically pivoted thereto a lifting arm or link 35 which extends upwardly and has its upper end bent at right angles and pivoted in an adjusting block 36 which is slidably connected to a standard 37 which in this instance is formed as an arch fixed to the frame member 11 and having its inner branch or limb forming the guide for the adjusting block 36 which has a vertical opening 36ª for receiving the inner branch of standard 37. Within standard 37 there is swiveled an adjusting screw 38 which is operated by means of a pivoted handle 39 which may be dropped downwardly out of the way when not in use. The adjusting block 36 has a vertical screw threaded opening 36ᵇ in which the screw 38 is received and a transverse opening 36ᶜ in which the upper bent end of the lifting link 35 is pivoted. This construction just described provides a simple device for adjusting the depth of plowing as it will be evident that operation of the screw 38 will cause the plow frame to be raised or lowered relatively to its supporting wheels to an extent governed by length of screw 38, the throw of the power lift remaining the same. In order to provide for simultaneous adjustment of the rear furrow wheel, an arm 40 is clamped to the axle 22 and a rearwardly extending connecting rod 41 has one end pivoted in the arm 40 and its rear end secured in a pivoted sleeve 42 on one end of bell crank lever 43 which is pivoted to the furrow wheel bracket 18 and has its other end connected as by link 44 to the upper end of the standard 45 of the rear furrow wheel which is swiveled in the usual manner in the bracket 18. With this construction the rear furrow wheel will be raised and lowered in unison with the front wheels and a substantially level lift is provided.

In connection with this plow, there is preferably employed the novel form of adjustable hitch described and claimed in the copending application of J. R. Barker, Serial No. 559,090 filed May 6, 1922 which consists of a bracket 46 slidably mounted on plate 12 and adjustable from end to end thereof, and capable of being locked thereto by means of the screw stud 47 which may be manipulated by the pivoted handle 48. The bracket 46 has vertically spaced lugs 46ª in which there is journaled a standard or post 47' which has its upper end bent toward the furrow side of the plow to form a crank arm 47ª. A clevis 48' is secured to standard 47 between the lugs 46ª and to this clevis there is adjustably pivoted the rear end of a draft bar 49 by which the plow is coupled to the tractor. The outer end of crank arm 47ª has pivoted thereto the forward end of a coupling rod 50 which may be formed of adjustable telescopic sections as shown and which has its rear end pivoted to an arm 51 fixed to the upper end of the rear furrow wheel standard and extending laterally therefrom toward the land side of the plow. With this construction the tractor hitch may be moved from one side to the other of the plow as necessitated by use of the plow near a row of trees and, as the bracket 46 is moved, the post 47 will be swung, owing to its connection to bar 50, in a manner to angle the coupling bar 49 with relation to the plow and away from the trees so as to offset the tractor to the extent required.

By the construction and arrangement of frame and axle above described, a narrow plow that will work close up to rows of trees in an orchard is provided and one which, although of narrow wheel tread, will not have a tendency to upset, for the reason that the center of gravity is brought well within the tread of the land wheel and the relative length of the axle cranks is such that the plow when raised will be tilted to some degree toward the furrow side further stabilizing it. The arched portion of frame member 10 permits use of the long land wheel crank and positioning of the land wheel inside of the frame, the arch allowing the spindle 23ª to travel upwardly a sufficient extent to secure the maximum necessary depth of plowing.

The construction above described exemplifies the preferred form of my invention and variations therefrom may be made within the scope of the following claims.

I claim as my invention:

1. In a wheel plow, a frame comprising laterally spaced bars one of which is arched, an axle journaled thereon and provided with a forwardly directed crank positioned outside said arched bar and having an inwardly directed spindle at its end extending under said bar, a wheel journaled on said spindle within the frame, and means for swinging said crank to raise and lower the frame.

2. In a wheel plow, a frame comprising laterally spaced bars one of which is arched, an axle journaled thereon and provided with a forwardly directed crank positioned outside said arched bar and having an inwardly directed spindle at its end extending under said bar, a wheel journaled on said spindle within the frame, means for swinging said crank to raise and lower the frame comprising a lifting link connecting the inner end of said spindle with a vertically adjustable element mounted on the frame.

3. In a wheeled plow, a frame comprising laterally spaced bars, the one on the land side being arched, an axle journaled on said bars and having forwardly extending land and furrow wheel cranks at opposite sides of the frame, an inwardly extending spindle on the land wheel crank, a land wheel journaled on said spindle within the frame, an outwardly extending spindle on the other crank on which the furrow wheel is journaled, and lifting mechanism connecting the inner end of said land wheel spindle to the frame.

4. In a wheeled plow, a frame comprising laterally spaced bars, the one on the land side being arched, an axle journaled on said bars and having forwardly extending land and furrow wheel cranks at opposite sides of the frame, the land wheel crank being of greater length than the furrow wheel crank and offset therefrom, an inwardly extending spindle on the land wheel crank, a land wheel journaled on said spindle within the frame, an outwardly extending spindle on the other crank on which the furrow wheel is journaled, and lifting mechanism connecting the inner end of said land wheel spindle to the frame.

5. In a wheeled plow, a frame comprising laterally spaced bars one of which is arched, a bearing bracket secured beneath said arched bar, a second bracket secured above the other bar in alignment with the first bracket, a one-piece axle having its central portion journaled in said brackets and forwardly extending offset cranks on each side of the frame, the crank adjacent the arched bar having its end bent inwardly to extend within the frame.

6. In a wheeled plow, a frame, a one-piece axle having a central portion journaled on the front of the frame and provided with cranks carrying land and furrow wheels respectively, the land wheel crank being of greater length than the furrow wheel crank and offset therefrom an arm fixed to said central portion of the axle, a vertically adjustable rear furrow wheel on the frame, a link connecting the rear furrow wheel to said arm, and means for oscillating said axle to raise and lower the frame.

7. In a wheeled plow, a frame, comprising forward spaced members, an axle having a central portion journaled on the front of the frame and provided with forwardly extending land and furrow wheel cranks, the land wheel crank being of greater length than the furrow wheel crank and offset therefrom, horizontally extended ends on said cranks forming spindles, the spindle of the land wheel crank being positioned within said spaced members and the furrow wheel outside thereof, land and furrow wheels journaled on said spindles, respectively, and means for shifting said cranks to raise and lower the frame.

In testimony whereof I affix my signature.

WILLIAM S. GRAHAM.